United States Patent
Min

(10) Patent No.: US 9,983,760 B2
(45) Date of Patent: May 29, 2018

(54) APPARATUS, METHOD AND COMPUTER READABLE RECORDING MEDIUM FOR ARRANGING A PLURALITY OF ITEMS AUTOMATICALLY IN A CANVAS

(71) Applicant: Naver Corporation, Seongnam-si (KR)

(72) Inventor: Jae Sik Min, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 350 days.

(21) Appl. No.: 14/090,565

(22) Filed: Nov. 26, 2013

(65) Prior Publication Data

US 2014/0149926 A1    May 29, 2014

(30) Foreign Application Priority Data

Nov. 26, 2012 (KR) .......................... 10-2012-0134262

(51) Int. Cl.
*G06F 3/0481* (2013.01)
*G06F 3/0484* (2013.01)
(Continued)

(52) U.S. Cl.
CPC ........ *G06F 3/0481* (2013.01); *G06F 3/04845* (2013.01); *G06T 3/4038* (2013.01); *G06T 11/60* (2013.01)

(58) Field of Classification Search
CPC .. G06F 17/509; G06F 3/0481; G06F 3/04845; G06Q 10/00; G06Q 10/08; G06Q 30/00; G06T 11/60
See application file for complete search history.

(56) References Cited

U.S. PATENT DOCUMENTS 7,620,267 B2   11/2009  Widdowson
7,743,322 B2    6/2010  Atkins
(Continued)

FOREIGN PATENT DOCUMENTS

JP    2005110279 A    4/2005
JP    2009535696 A   10/2009
(Continued)

OTHER PUBLICATIONS

Visio-Resizing Multiple Shapes, Dec. 13, 2011, Viziblr, pp. 1-12.*
(Continued)

*Primary Examiner* — Justin S Lee
(74) *Attorney, Agent, or Firm* — Greer, Burns & Crain Ltd.

(57) ABSTRACT

An apparatus arranges a plurality of items automatically in a form of collage in a canvas while maintaining the original size ratio between the items. The apparatus includes: an arrangement position selecting unit determining a position of a cell which is divided to arrange a k-th item among the respective cells having k–1 items arranged therein in the canvas; a cell dividing unit dividing a cell region of the position determined by the arrangement position selecting unit; an item arranging unit arranging the k-th item at the position of the divided cell; and a first canvas size adjusting unit increasing an entire size of the canvas as needed in the case in which a space to be arranged is insufficient when the item arranging unit arranges the k-th item at the position of the divided cell.

22 Claims, 11 Drawing Sheets

(51) Int. Cl.
*G06T 3/40* (2006.01)
*G06T 11/60* (2006.01)

(56) References Cited

U.S. PATENT DOCUMENTS

| | | | |
|---|---|---|---|
| 2006/0200758 A1* | 9/2006 | Atkins | G06T 11/60 |
| | | | 715/209 |
| 2006/0259857 A1* | 11/2006 | Atkins | G06T 11/60 |
| | | | 715/235 |
| 2007/0253028 A1* | 11/2007 | Widdowson | G06T 11/60 |
| | | | 358/1.18 |
| 2008/0082912 A1 | 4/2008 | Atkins | |
| 2009/0002764 A1 | 1/2009 | Atkins et al. | |
| 2009/0067753 A1* | 3/2009 | Hanechak | G06T 3/0006 |
| | | | 382/298 |
| 2009/0210215 A1* | 8/2009 | Konno | G06F 17/217 |
| | | | 704/3 |
| 2010/0142833 A1* | 6/2010 | Ishizawa | G06F 17/30274 |
| | | | 382/224 |
| 2011/0096075 A1* | 4/2011 | Borders | G06T 11/60 |
| | | | 345/441 |
| 2012/0206496 A1 | 8/2012 | Cok | |
| 2012/0306929 A1* | 12/2012 | Chalkov | G06F 3/0488 |
| | | | 345/666 |

FOREIGN PATENT DOCUMENTS

| | | |
|---|---|---|
| JP | 2010532042 A | 9/2010 |
| JP | 2011113509 A | 6/2011 |
| KR | 10-1049813 | 7/2011 |

OTHER PUBLICATIONS

Resize a Shape, May 31, 2007, Microsoft, pp. 1-2.*
Andrei Guk, How to crop and resize without distorting the image?, Apr. 26, 2007, Paint.net, pp. 1-10.*
Notice of Allowance issued by the Korean IP Office in corresponding Korean Patent App. No. 10-2012-0134262, dated May 23, 2014.
Office Action issued in corresponding Japanese Patent application No. 2013-228605, dated Nov. 14, 2017.

* cited by examiner

FIG. 14

| | | | | | | | |
|---|---|---|---|---|---|---|---|
| 10 | RIGHT | 3 | SUSPEND | 2 | RULE | 2 | HISTORY |
| 10 | PEOPLE | 3 | SEPARATE | 2 | RENDER | 2 | HAPPINESS |
| 9 | STATES | 3 | SEAS | 2 | PURPOSE | 2 | FRIENDS |
| 9 | LAWS | 3 | REPRESENTATIVE | 2 | PUBLIC | 2 | EQUAL |
| 9 | GOVERNMENT | 3 | PROTECTION | 2 | PRETENDED | 2 | ENDEAVOURED |
| 8 | POWER | 3 | PEACE | 2 | POLITICAL | 2 | DESTRUCTION |
| 8 | LEGISLATE | 3 | PASS | 2 | PETITION | 2 | CONNECTION |
| 7 | NEW | 3 | MANKIND | 2 | OFFICES | 2 | CONDITIONS |
| 6 | TIME | 3 | JUSTICE | 2 | OBSTRUCT | 2 | CIVIL |
| 5 | REFUSE | 3 | FOREIGN | 2 | OBJECT | 2 | CIRCUMSTANCES |
| 5 | DECLARE | 3 | ESTABLISH | 2 | NECESSITY | 2 | CASES |
| 4 | WAR | 3 | DISSOLVE | 2 | NATURE | 2 | BRITISH |
| 4 | TYRANNY | 3 | CONSENT | 2 | MEN | 2 | BRITAIN |
| 4 | INDEPENDENT | 3 | CAUSE | 2 | LIVES | 2 | BODIES |
| 4 | FREE | 3 | ALTER | 2 | JURISDICTION | 2 | ARMIES |
| 4 | COLONIES | 3 | ACT | 2 | JUDGE | 2 | APPEAL |
| 4 | ASSENT | 2 | UNITED | 2 | INVASION | 2 | AGES |
| 4 | ABOLISH | 2 | TRIAL | 2 | INSTITUTE | | |
| 3 | WORLD | 2 | TRANSPORTING | 2 | INJURY | | |
| 3 | USURPATIONS | 2 | SYSTEM | 2 | INHABITANTS | | |

FIG. 15

REFUSE REPRESENTATIVE CAUSE
JUDGE NEW RIGHT BRITAIN
PUBLIC NATURE
MEN AGES RENDER
CONDITIONS TIME STATES
ALTER
USURPATIONS INJURY
SYSTEM COLONIES
ACT OBJECT APPEAL TYRANNY ABOLISH
POWER SEAS DECLARE
POLITICAL
PURPOSE INDEPENDENT LAWS
PETITION
TRANSPORTING CIRCUMSTANCES
GOVERNMENT
FOREIGN RULE LEGISLATE
TRIAL FREE
LIVES
OFFICES ASSENT DISSOLVE SEPARATE
FRIENDS
PASS SUSPEND JURISDICTION DESTRUCTION WAR
JUSTICE INVASION WORLD ENDEAVOURED PEACE
HISTORY CASES INSTITUTE PRETENDED INHABITANTS
NECESSITY HAPPINESS
CIVIL PROTECTION PEOPLE
EQUAL
CONNECTION OBSTRUCT
BRITISH BODIES ARMIES
UNITED ESTABLISH CONSENT MANKIND

APPARATUS, METHOD AND COMPUTER READABLE RECORDING MEDIUM FOR ARRANGING A PLURALITY OF ITEMS AUTOMATICALLY IN A CANVAS

CROSS-REFERENCE TO RELATED APPLICATIONS

This application claims priority from and the benefit of Korean Patent Application No. 10-2012-0134262, filed on Nov. 26, 2012, which is hereby incorporated by reference for all purposes as if fully set forth herein.

BACKGROUND

Field

The present invention relates to an apparatus for arranging items such as picture, text, or the like in a limited canvas, and more particularly, to an apparatus, a method, and a computer readable recording medium for arranging a plurality of items automatically in a canvas in a form of a collage while maintaining the original size ratio between the items.

Discussion of the Background

Since a function (i.e., a collage function) of arranging items (for example, picture, text or the like) having various sizes and shapes in one fixed space on-line may show a plurality of items at a glance, this function is frequently used in web contents or the like.

As an example of a technology for arranging the various items in one space, a method of generating a collage with a plurality of pictures is disclosed in U.S. Pat. No. 7,743,322 entitled "Automatic Photo Album Page Layout" filed by Hewlett-Packard Co., where the pictures are arranged in an order of input thereof, and a newly input picture is arranged at the right or lower portion of one among the existing arranged pictures. The above processes are repeated until inputs of all pictures are completed.

However, in order to arrange the input picture at the right or lower portion of an existing arranged picture, it is necessarily required to change the size of the input picture. Therefore, the relative sizes between the original pictures may not be maintained in the finally generated collage. That is, a case in which a picture originally having the smallest size may be shown to be the largest size in the collage.

As another example, a method of arranging as many images as possible in a rectangular region having a fixed size to reduce space waste is disclosed in Korean Patent No. 10-1049813 entitled "Method and Apparatus for Arranging Automatically Images" and filed by NHN Corporation, where the largest image not exceeding the size of the region is arranged at a corner of the left upper portion of the region, two remaining spaces having a rectangular shape at the right and the lower portion of the arranged image are set as new spaces, and subsequent images are then repeatedly arranged in the new spaces in the same scheme.

However, the above-mentioned arrangement method of Korean Patent No. 10-1049813 is a scheme in which it densely and fixedly arranges the item at the corner of the left upper portion of each region and arranges the subsequent items in the remaining space, and in this method, it is impossible to form a new space between the items that are already arranged and subsequent items. In addition, in the above-mentioned method, since the item exceeding the size of a specific region may not be arranged in the specific region and has to find another larger region to be arranged, utilization rate of the space is relatively low. In addition, since the above-mentioned method has an object of minimizing memory waste at the time of graphic work rather than a collage generation, a method of effectively distributing the remaining spaces, or the like may not be considered.

Therefore, there is a need for a method for arranging items to minimize blank spaces of a collage by maximally visualizing each item while exactly maintaining a size ratio between the items in the limited space.

BRIEF SUMMARY OF THE INVENTION

An object of the present invention is to provide an apparatus, a method, and a computer readable recording medium for arranging plurality items (e.g., picture or text) automatically in a quadrangular canvas having a fixed aspect ratio.

Another object of the present invention is to provide an apparatus, a method, and a computer readable recording medium for arranging a plurality items automatically in a canvas capable of generating a collage image while intactly maintaining an original shape of each item and sizes between the items.

A characteristic configuration of the present invention for accomplishing the objects of the present invention as described above and unique effects of the present invention will be described below.

According to an aspect of the present invention, there is provided an apparatus for automatically arranging a plurality of items in a canvas, the apparatus including: an arrangement position selecting unit determining a position of a cell which is divided to arrange a k-th item among the respective cells having k−1 items arranged therein in the canvas; a cell dividing unit dividing a cell region of the position determined by the arrangement position selecting unit; an item arranging unit arranging the k-th item at the position of the divided cell; and a first canvas size adjusting unit increasing the size of the canvas as needed in the case in which a space to be arranged is insufficient when the item arranging unit arranges the k-th item at the position of the divided cell.

The apparatus may further include: an item aligning unit aligning n items to be arranged in the canvas in the order of size; and an item selecting unit selecting an item to be arranged one by one in the size order from the n items aligned by the item aligning unit.

The apparatus may further include: an arrangement quality calculating unit calculating arrangement cost of the k-th item for each of a first item to a k−1-th item already arranged in the canvas to determine a cell having an item having the minimum calculated arrangement cost arranged therein as the cell to be divided.

The arrangement cost may be calculated based on a blank space of the cell, a size of a portion to be cut out of the cell at the time of expanding the item arranged in the cell, or a size of the k-th item.

The cell dividing unit may horizontally or vertically divide the cell region of the position selected by the arrangement position selecting unit, and perform the horizontal division when an aspect ratio of the k-th item to be arranged is smaller than an aspect ratio of the cell of the selected position and performs the vertical division when the aspect ratio of the k-th item to be arranged is not smaller than the aspect ratio of the cell of the selected position.

The first canvas size adjusting unit may increase the entire size of the canvas while constantly maintaining a preset aspect ratio of the canvas.

The apparatus may further include: an item position exchanging unit increasing arrangement efficiency by configuring the items arranged in the canvas in a tree form according to a division structure and exchanging positions of two items positioned on the same subtree of the tree with each other.

The item position exchanging unit may confirm a change of penalty calculated by the arrangement quality calculating unit in response to the position exchanging, obtain a list of pairs in which a larger value of the penalties of two items becomes lower due to the position exchanging, and sequentially perform the position exchanging with start from the pair in which the penalty becomes lower as much as possible, and the penalty may be calculated based on a blank space of the cell having each item arranged therein and a size of a portion to be cut out of the cell at the time of expanding each arranged item.

The apparatus may further include a blank removing unit minimizing a blank by adjusting the final cell boundary of each item arranged on the canvas.

The apparatus may further include a second canvas size adjusting unit reducing the size of the canvas having the minimized blank spaces by the blank removing unit at the same ratio to thereby adjust to a preset size.

The apparatus may further include an item rotation processing unit rotating each item by a preset angle about a cell center without cutting each item arranged on the canvas.

According to an aspect of the present invention, there is provided a method for automatically arranging a plurality of items in a canvas performed in an apparatus for arranging automatically the items in the canvas, the method including: an operation of determining a position of a cell which is divided to arrange a k-th item among the respective cells having k−1 items arranged therein in the canvas; an operation of dividing a cell region of the determined position; an operation of arranging the k-th item at the position of the divided cell; and an operation of increasing an entire size of the canvas as needed in the case in which a space to be arranged is insufficient when the k-th item is arranged at the position of the divided cell.

Information for performing the processes of arranging the plurality of items automatically in the canvas may be stored in a server computer readable recording medium. The recording medium may include all kinds of recording media in which a program and data are stored so as to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). In addition, the recording medium may be distributed in a computer system connected by a network, such that a computer readable code may be stored and executed in a distributed scheme.

BRIEF DESCRIPTION OF THE DRAWINGS

FIG. 14 is a view showing a frequency count of words to be arranged according to an exemplary embodiment of the present invention;

FIG. 15 is a view showing a word cloud of the words of FIG. 14 in the arrangement structure of FIG. 3 according to an exemplary embodiment of the present invention.

DETAILED DESCRIPTION OF THE ILLUSTRATED EMBODIMENTS

Figure 1:
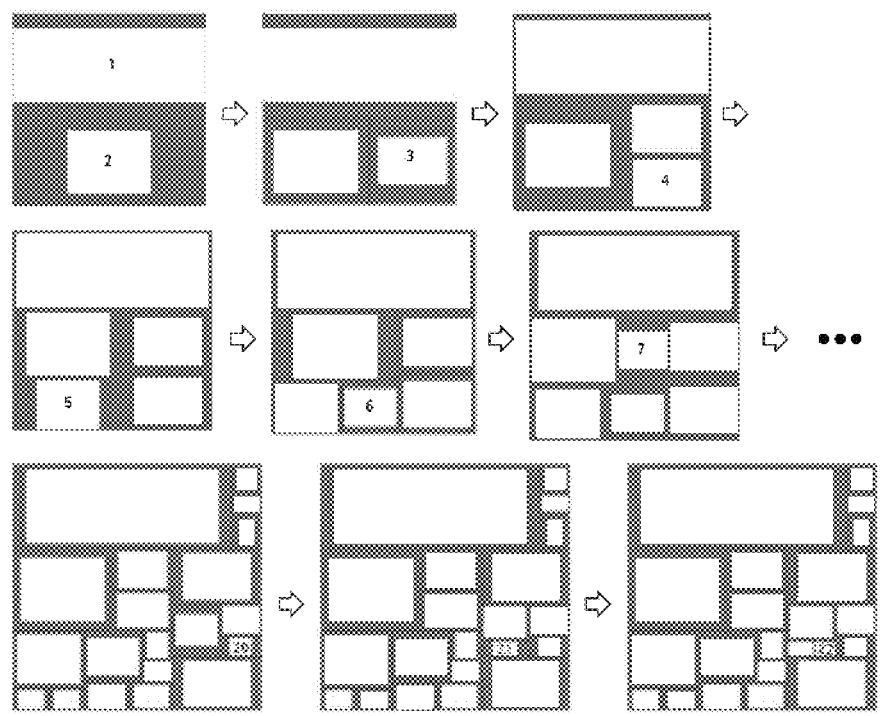
FIG. 1 is a view showing examples of processes of arranging an item according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc., does not denote a limitation of quantity, but rather denotes the presence of at least one of the referenced item. The use of the terms "first", "second", and the like does not imply any particular order, but they are included to identify individual elements. Moreover, the use of the terms first, second, etc., does not denote any order or importance, but rather the terms first, second, etc., are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

The present invention discloses an apparatus and a method for arranging a plurality items automatically in a canvas capable of generating a collage image by arranging the plurality items (e.g., picture or text) automatically in a quadrangular canvas having a fixed aspect ratio.

The present invention discloses an arrangement method capable of maximizing the amount of information by minimizing blank spaces while intactly maintaining an original shape of each item and sizes between the respective items in generating the collage image by arranging the plurality of items.

Since a collage function of arranging items having various sizes and shapes in one canvas may simultaneously show the contents of each item and the sizes between the items at a glance, it has excellent visual effect. Therefore, in order to maximally visualize each item while exactly maintaining the size ratio between the items in the limited canvas, a method for arranging the items minimizing the blank spaces of the collage is important.

The word 'item' used in the present invention represents a unit-object arranged to generate the collage image. An example of an item may include a picture or a text, as well as an animation or a video occupying a predetermined region, but the present invention is not limited thereto.

In addition, the word 'crop' used in the present invention described below represents cutting a portion of a selected region (e.g., a primary region) from an entire region of a specific image and a word 'overlay' represents overlaying and editing a plurality of images.

In addition, the word 'canvas' used in the present invention described below represents a quadrangular space used in arranging a plurality of selected image items therein. The canvas is generated so that an aspect ratio thereof is constantly maintained.

In addition, the word 'cell' used in the present invention described below represents a region occupied by each item, and may include the region occupied by the corresponding item and a blank space around the item.

Hereinafter, exemplary embodiments of the present invention will be described in detail with reference to the accompanying drawings so that those skilled in the art to which the present invention pertains may easily implement the spirit of the present invention.

A concept according to the exemplary embodiments of the present invention will be described with reference to FIGS. 1 to 3 and an apparatus and a method according to the exemplary embodiments of the present invention will be described in detail with reference to FIGS. 4 to 6.

Concept for Arranging Items Automatically

FIG. 1 is a view showing examples of the processes for arranging image items in a canvas according to an exemplary embodiment of the present invention. The arranged image items form a collage image which may be produced on a display connected to the apparatus for arranging image items (described in detail below), or provided to a web server, for example, to be displayed on a webpage.

Referring to FIG. 1, a total of n (n is a natural number) input items are first aligned in an order of size. In this case, the largest item is designated as a first item ($item_1$) and the smallest item is designated as an n-th item ($item_n$). In addition, a canvas in which each item is arranged to generate a collage image is generated. A horizontal to vertical ratio of the canvas is constantly maintained at a preset ratio according to a ratio of the collage image to be finally generated. However, in an operation of arranging the items, the size of the canvas may be increased as described below, if necessary, and at the time of generation of the final collage image, the size thereof may be again adjusted to an initial set size. Although the exemplary embodiment of the present invention described below describes a case which assumes a canvas having a square shape defining the horizontal to vertical ratio of 1 for convenience of explanation, the canvas according to the present invention is not limited to the square shape.

When the horizontal to vertical ratio of the canvas is 1, the size and shape of an initially set canvas has a quadrangular shape having a minimum area sufficient to arrange a first item therein. When the canvas is generated as described above, the first item is arranged first in the canvas. While the result is the same even though the first item is arranged at any position in the canvas, the first item is arranged at the center of the canvas for convenience. In this case, a region occupied by the first item in the canvas (hereinafter, a 'cell') is the entire canvas. That is, one cell is one rectangle including a space occupied by the corresponding item and a remaining blank space.

As the next operation, a second item is arranged, where the cell of the first item is horizontally divided to be arranged over or below the second item, and as another exemplary embodiment, the cell of the first item may be vertically divided to be arranged at the left or right of the second item. A selection criterion for whether the cell is horizontally or vertically divided is described below. In the case in which the space is not enough to arrange the second item in the divided spaces, the size of the canvas is increased as needed. Also in this case, since the horizontal to vertical ratio of the canvas (e.g., the square shape) needs to be maintained, the canvas is also increased by the same length in a vertical direction of a direction needed to be increased.

As such, the arranged second item has divided the cell of the first item. In this case, similar to the blank space in the cell, the first item and the second item are divided according to a size ratio of the items. Meanwhile, the second item may be arranged at any position in an assigned cell. However, the second item is arranged at a cell center as shown in FIG. 1 for convenience of explanation.

In the next operation, it is first determined whether the input item is arranged by dividing a cell region of any item of the existing arranged items and the input item is arranged in the same method as the above-mentioned method. In addition, it is determined whether the horizontal division or vertical division is performed for the cell determined to be divided and arranged similar to the above-mentioned method, and the input item is arranged in the same scheme as the above-mentioned scheme. A selection criterion of the horizontal division and the vertical division is described below. In addition, similar to the arrangement of the second item, in a case of an insufficient space, the size of the canvas is increased as needed while maintaining the horizontal to vertical ratio of the canvas.

The above-mentioned process is repeated up to the item having the smallest size (i.e., the n-th item). Whenever a new item is arranged, the cell region of each item is adjusted so that the blank space of the canvas is entirely and uniformly distributed.

FIG. 1 shows, as an illustration, a process in which twenty-two (i.e., n=22) items are arranged in the above-mentioned method according to the exemplary embodiment of the present invention. As shown in FIG. 1, the size of the square canvas is increased as needed. For example, the size of the square canvas has been increased as needed at the time of arrangement of a fourth item, a fifth item, a sixth item, and a seventh item.

As such, when the primary item arrangement is completed as shown in FIG. 1, processes of optimizing the item arrangement and minimizing the blank spaces by exchanging the positions of the arranged items are performed.

Figure 2:
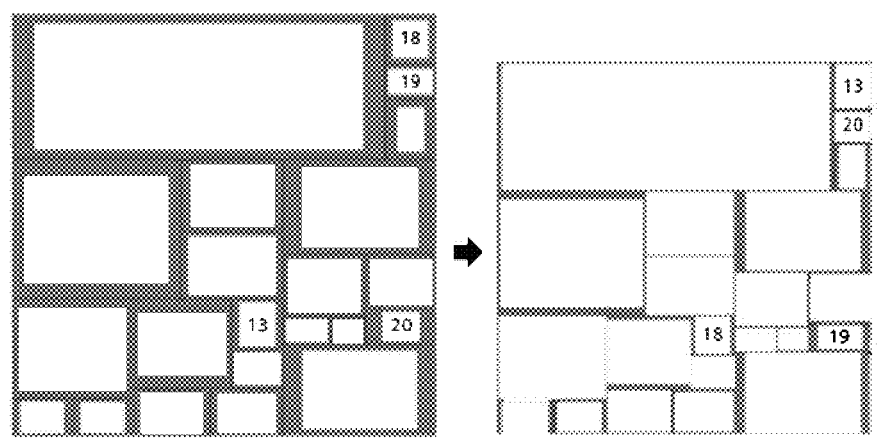
FIG. 2 is a view showing a result of optimizing the item arrangement and minimizing blank spaces according to an exemplary embodiment of the present invention.

FIG. 2 is a view showing a result of optimizing the item arrangement and minimizing blank spaces according to an exemplary embodiment of the present invention.

Referring to FIG. 2, space utilization may be optimized and the blank spaces may be minimized by rearranging the items arranged as in FIG. 1. That is, by exchanging the positions of the items arranged as shown, the space utilization may be optimized.

In the case in which the items are arranged by the method of FIG. 1, since the arrangement order of the items is fixed in the size order, the primary arrangement result of FIG. 1 may not be necessarily an optimal arrangement. Therefore, in the case in which exchanging a pair of items with each other in the primary arrangement is preferable to the space utilization, the positions of the corresponding two items are exchanged. A detailed criterion determining whether or not the position exchange is performed will be described below.

Next, the blank spaces may be minimized by adjusting the final cell boundary. That is, even after the primary arrangement of FIG. 1 and the position change of FIG. 2 as described above, the respective items may include blank spaces that more than what is needed in each cell. Since the blank spaces in each cell are needed in the process of arranging the item, they need to be removed after the arrangement and the position change are completed.

FIG. 2 shows the result (left) of the primary arrangement of FIG. 1 and the result (right) of rearranging and optimizing the primary arrangement. As shown in FIG. 2, the positions of some items have been changed by the optimization due to the re-arrangement of the items. For example, positions of the thirteenth item and the eighteenth item are exchanged with each other, and positions of the nineteenth item and the twentieth item are exchanged with each other. In addition, it may be confirmed that the size of the canvas is significantly decreased by removing the blank spaces of the canvas as much as possible in an allowed range.

Figure 3:
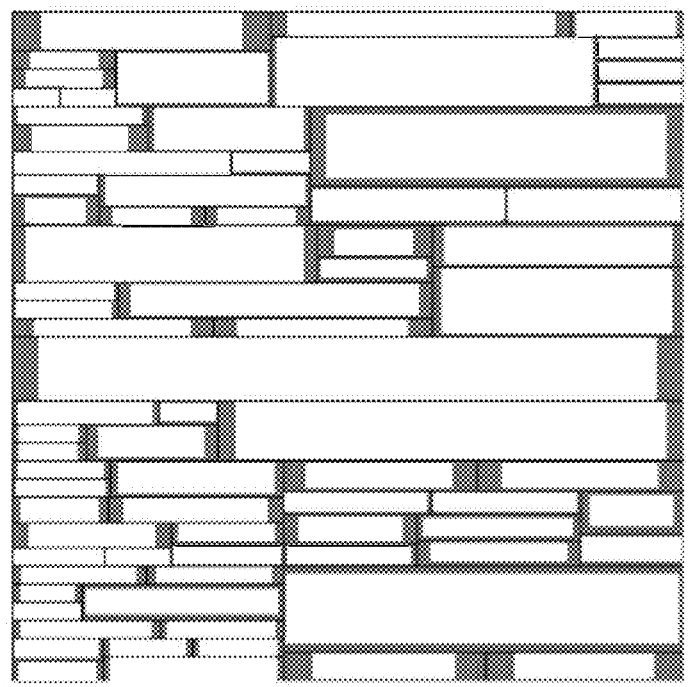
FIG. 3 is a view showing a result of arranging a text item according to an exemplary embodiment of the present invention.
Figure 4:
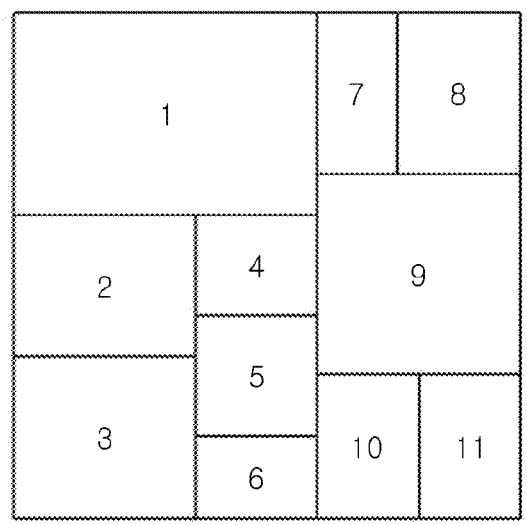
FIG. 4 is a view showing an item arrangement structure according to an exemplary embodiment of the present invention.

FIG. 3 is a view showing a result of arranging text items according to an exemplary embodiment of the present invention. Referring to FIG. 3, the texts shown in FIG. 14, for example, may also be arranged in an item unit according to the exemplary embodiment of the present invention. In this case, the text items may be arranged by differentiating the size of the cell occupied depending on a generation frequency of each word and arranging each word in the same method as the above-mentioned method for arranging image items. The detailed description thereof will be provided below.

When the arrangement of the item is optimized according to the processes as in FIGS. 1 to 3, various methods may be utilized. For example, in the case in which the item is a picture, when each picture is superimposed on the item region on the final arrangement view by adjusting the size of the original picture as shown in FIG. 2, a basic photo collage having a shape as in FIG. 11 may be obtained. Here, it may be understood that the shapes of the original pictures and the size relationship between the original pictures are completely maintained.

Figure 11:
FIG. 11 is a view showing an example of a basic photo collage after an arrangement optimization according to an exemplary embodiment of the present invention.
Figure 12:
FIG. 12 is a view showing an example of the photo collage having no blank space according to an exemplary embodiment of the present invention.

In this case, when each item expands each picture to the same horizontal to vertical ratio so as to occupy the blank spaces in the cell of each item in FIG. 11 according to the exemplary embodiment of the present invention, the photo collage having no blank as in FIG. 12 may be obtained.

Figure 13:
FIG. 13 is a view showing an example of the photo collage having rotated items according to an exemplary embodiment of the present invention.

In the case of FIG. 12, a portion of each picture out of each corresponding cell while expanding the picture is cut. Here, it may not be known from the entire collage image how much portion is cut. In some cases, information about which a portion not seen from the collage occupies some degree of the original picture may be needed. In this case, when each picture is randomly rotated about the cell center by a predetermined angle while being not cut from the basic collage according to the exemplary embodiment of the present invention, a collage having a different form capable of guessing how much portion is not seen from the collage may be obtained as shown in FIG. 13.

As another application example according to the present invention, in the case in which each item is the text as described above, a word cloud showing the weight of each text as shown in FIG. 15 may be generated using the method for arranging the item according to the present invention. In this case, the weight of each item (i.e., the text) may be defined as a preset value such as importance, generation frequency, or freshness of the word.

Therefore, when the word cloud is generated as shown in FIG. 15, the weight of each word may be visually recognized at a glance, such that this scheme has high information delivery capability in that an information amount is represented by directly reflecting the size of the word, unlike a scheme such as a bar graph, or the like.

That is, according to the exemplary embodiment of the present invention, each word may be input together with the weight as shown in FIG. 14. In this case, the input weight determines a font size of the word to be expressed, that is, a vertical size of each item, and a length (a number of characters) of the word itself determines a horizontal size of the item.

For example, when seventy seven words are input together with generation frequency information in a document as shown in FIG. 14, the horizontal and vertical sizes of the item to be occupied by each word are determined. When the input data is applied to the method for arranging the item according to the present invention, the item arrangement result for the seventy seven words as shown in FIG. 3 may be obtained.

In this case, when each word of FIG. 14 is written on the corresponding item position, the word cloud as in FIG. 15 may be obtained. Therefore, all words having the weight reflected thereto using the method for arranging the item as described above are represented in a dense form, such that the maximal information may be delivered in the limited space.

In the case of the word cloud, an important item is allowed to occupy the larger region based on the generation frequency of the word, as in FIG. 15, thereby visually emphasizing the important item. According to the exemplary embodiment of the present invention, also in the case of the picture, when the picture is determined as an important picture regardless of the size of the original picture, a large cell is artificially assigned to the important picture, thereby making it possible to preferentially bring the important picture to a person's notice from the photo collage. In this case, the importance may be designated by a user or automatically calculated.

In addition, according to the exemplary embodiment of the present invention, a collage having various combinations for the same item may also be generated. For example, the arrangement of the items as in FIG. 4 may be represented in a binary tree structure as shown in FIG. 5 and the process of arranging the items according to the present invention may correspond to the process of the binary tree.

Figure 5:
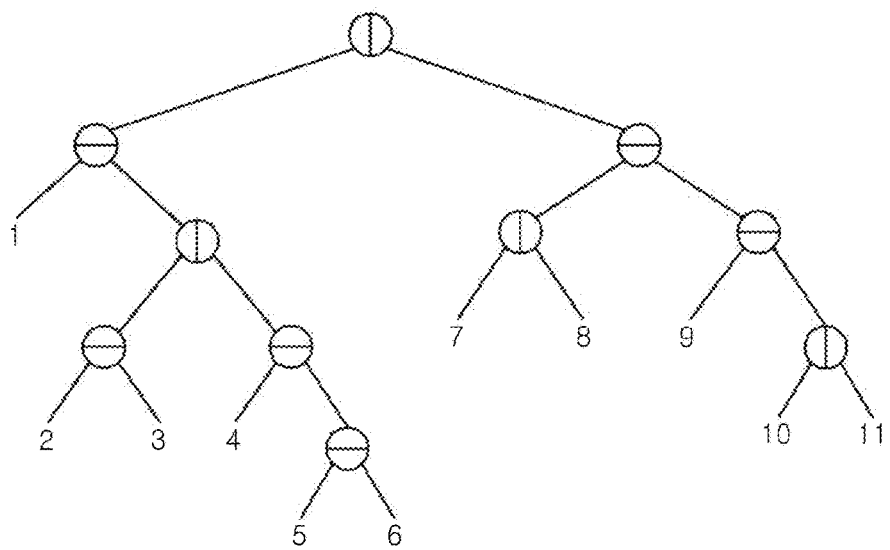
FIG. 5 is a view showing the item arrangement structure of FIG. 4 as a binary tree, according to an exemplary embodiment of the present invention.

Referring to FIG. 5, internal nodes except for an end from the binary tree of FIG. 5 necessarily have a pair of left and right subtrees. In this case, exchanging of positions of the left and right subtrees means that the collage having different shapes may be generated by exchanging the positions of the corresponding item in arranging the final determined item.

Figure 16A:
FIGS. 16A to 16C are views showing examples of combinations of different collages having the same structure.
Figure 16B:
Figure 16C:

Therefore, with a scheme exchanging the positions of the subtrees in FIG. 5, $2^{n-1}$ different collage combinations having the same structure may be formed using n items. FIGS. 16A, 16B, and 16C show illustrations of different collage combinations having the same structure as the collage arranged as in FIG. 12. That is, in the case in which the item is arranged as in FIG. 12, the positions are exchanged on the subtree of FIG. 5, such that the combinations of various arrangements as in FIGS. 16A to 16C may be generated.

Hereinabove, the concept of generating the collage by the item arrangement according to the present invention has been described. Hereinafter, the determination criterion used in the item arrangement in implementing the present invention will be described in detail. Particularly, an arrangement quality criterion of the arranged item and a position selection criterion when arranging the item will be described in detail.

Determination Criterion Used in Item Arrangement

First, describing the arrangement quality criterion of the arranged item, the arrangement quality of the item is one of the factors determining an arrangement position of a newly input item. In addition, the arrangement quality of the item plays an important role in selecting an item pair that the positions thereof are exchanged in the arrangement optimization process. Meanwhile, the arrangement quality is represented as a penalty according to the exemplary embodiment of the present invention, and the penalty of an i-th item ($item_i$) may be defined as represented by the following Equation 1.

$$\text{penalty}(i) = (1-\alpha) \times \text{waste}(i) + \alpha \times \text{cropcut}(i) \quad \text{[Equation 1]}$$

Figure 6:
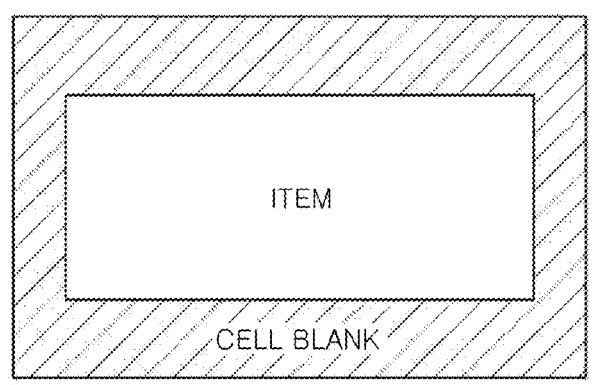
FIG. 6 is a view showing a blank region and an item region of a cell according to an exemplary embodiment of the present invention.

In the above Equation 1, waste(i) is a value representing a ratio of a cell size to a cell blank, that is, a ratio of the entire cell size to the cell blank represented by an oblique line in an example of FIG. 6. In this case, the value of waste(i) has a range of 0 to 1, where in the case in which the item fills the cell region without the cell blank, the size of the cell blank is 0, such that the value of waste(i) is 0.

Figure 7:
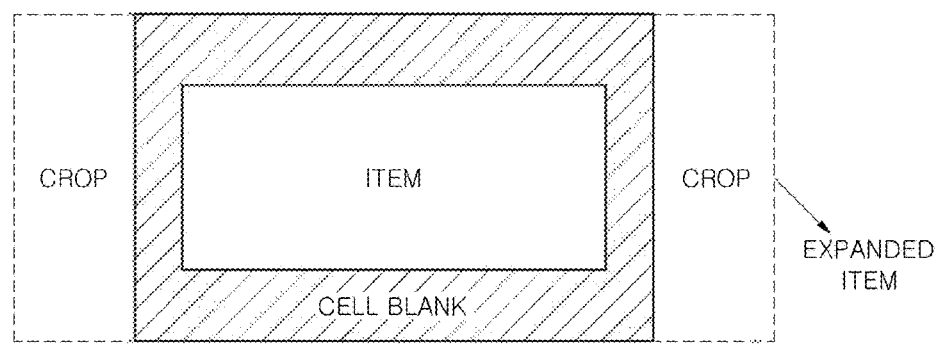
FIG. 7 is a view showing an expanded item and a correspondingly cut portion according to an exemplary embodiment of the present invention.

In the above Equation 1, cropcut(i) is a ratio of an item portion to be cut out of the cell when the item is expanded and covers the cell, that is, a value representing deviation of an aspect ratio, which is the horizontal to vertical ratio of the item and the cell. Referring to FIG. 7, in the case in which the item is expanded until a height thereof coincides with the cell, a portion (horizontal portion) of the expanded item exceeds the cell and the portion exceeding the cell is cropped and cut.

In this case, the value of cropcut(i) has a range of 0 to 1, and even though the cell blank is large, when the shapes of the item and the cell are similar, that is, the aspect ratio coincides with each other, the item does not need to exceed the cell blank to be expanded, such that the value of cropcut(i) is 0.

Meanwhile, $\alpha$ is real number between 0 and 1, and determines a weight ratio of waste(i) and cropcut(i). The $\alpha$ may be set to 0.5 as a basic value.

According to the exemplary embodiment of the present invention, the penalty values of all items are re-calculated immediately after a new item is arranged and a cell boundary adjustment is completed.

Criterion of Position Selection when Arranging the Item

In a state in which k−1 items are already arranged, when a k-th item ($item_k$) is arranged, the following two factors need to be determined.

First, a determination as to which cell of the items among the first item to k−1-th item already arranged in the canvas is to be divided?

Second, which of the horizontal division and the vertical division is selected?

In this case, according to the exemplary embodiment of the present invention, arrangement cost of the k-th item compared to each of the first item to the k−1-th item is calculated to thereby select the lowest-cost item, and the cell is divided. In addition, if the aspect ratio of the selected item is smaller than the aspect ratio of the cell, the horizontal division is performed, and otherwise, the vertical division is performed.

For example, the arrangement cost in the case in which a cell of r-th (r is natural number less than k) item is divided and the k-th item is arranged may be defined as represented by the following Equation 2.

$$\text{cost}_k(r) = \text{penalty}(r) \times \text{space\_cost}_k(r) \quad \text{[Equation 2]}$$

In the above Equation 2, space $\text{cost}_k(r)$ is a value subtracting the size of the k-th item ($item_k$) from a space value additionally required other than the cell blank when the cell of the r-th item ($item_r$) is divided and the k-th item ($item_k$) is arranged. Therefore, space_$\text{cost}_k(r)$ has generally the negative value and has the larger absolute value when the cell blank is large (i.e., the space_$\text{cost}_k(r)$ has a negative value when some amount of cell blank area remains in the divided cell of the r-th item after the k-th item is arranged therein). If the cell blank of the r-th item (item$_r$) has no cell blank, space_cost$_k$(r) has 0, which is the maximum value thereof (i.e., the space cost$_k$(r) has a value of 0 when no cell blank area remains in the divided cell of the r-th item after the k-th item is arranged therein).

According to the present invention, in order to provide a cell division priority to the item having a low arrangement quality (i.e., high penalty), the final arrangement cost (cost$_k$(r)) calculated by multiplying penalty(r) to space_cost$_k$(r) according to the Equation 2 is determined.

By using the above-mentioned method, a probability that the item having a large cell blank and bad arrangement quality among the existing items being selected as a target of the cell division may be increased, and the arrangement quality of the corresponding item may be improved when dividing the cell.

Criterion for Position Exchanging Between Items

According to the exemplary embodiment of the present invention, when the primary arrangement of the items is completed, the position exchanging for the item pairs capable of physically performing the position exchanging (i.e., the item pairs capable of entering the cell of each other) in order to optimize the arrangement result is attempted.

In this case, when the position exchanging is performed, the penalties of two items are changed, where a list of the pairs in which the larger value among the penalties of two items becomes lower due to the position exchanging is obtained.

Using the above-mentioned method, the position exchanging is sequentially performed with start from the pair in which the penalty becomes lower as much as possible. In this case, if the pairs including the item performing the position exchanging exist in a waiting list, the pairs are entirely removed from the waiting list.

The above-mentioned method is repeatedly performed, where the performance is stopped at a point in time in which the arrangement quality of the item having the minimum arrangement quality is not improved (i.e., the penalty of the item having the maximum penalty does not become lower). Through the above-mentioned method, the optimized arrangement may be obtained.

Hereinafter, an apparatus according to the exemplary embodiment of the present invention will be described with reference to FIG. 8 and a method according to the exemplary embodiment of the present invention will be described with reference to FIGS. 9 and 10.

Apparatus for Automatically Arranging Items

Figure 8:
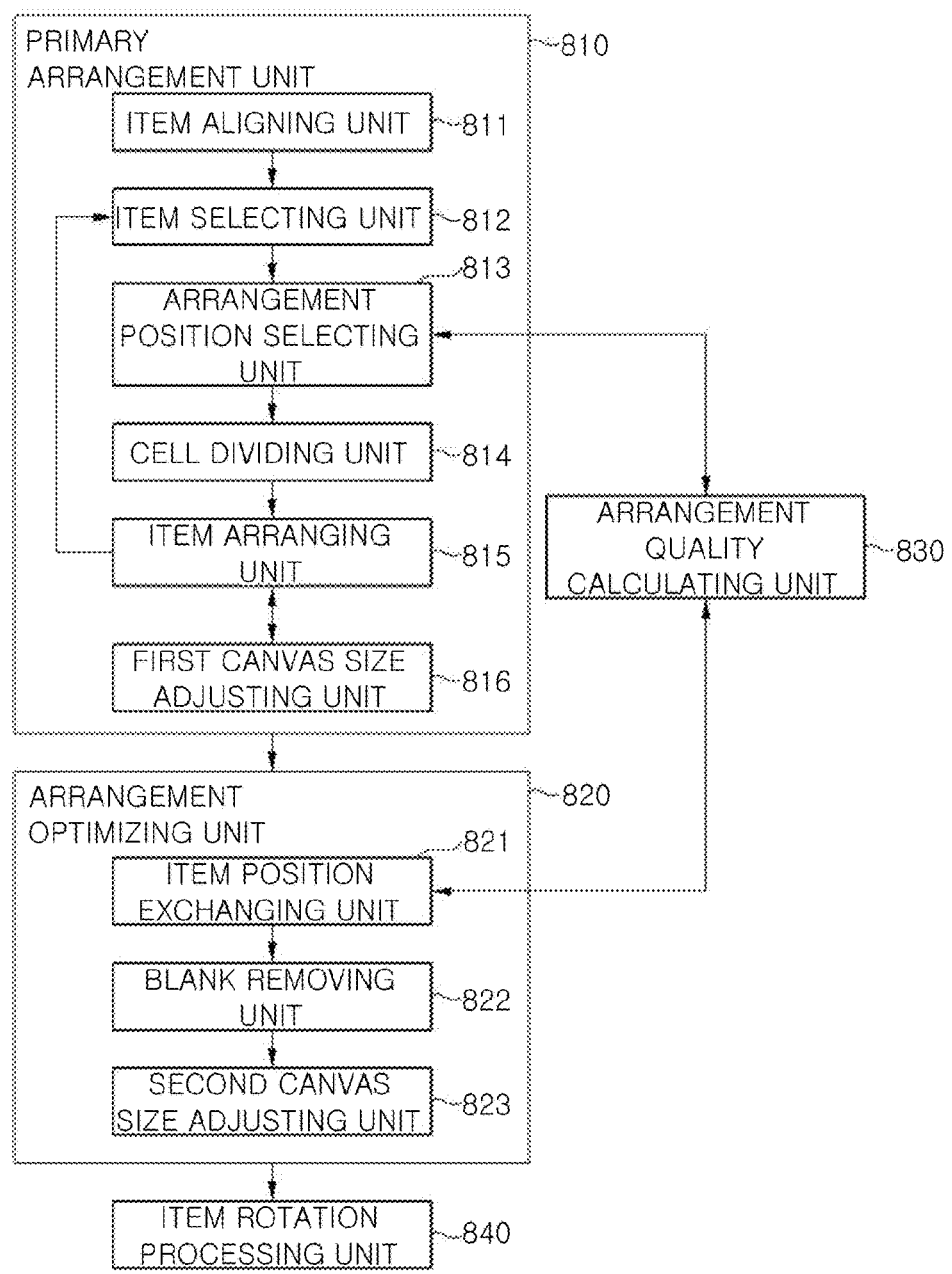
FIG. 8 is a block diagram showing a detailed configuration of an apparatus for arranging a plurality of items automatically in a canvas according to an exemplary embodiment of the present invention.

FIG. 8 is a block diagram showing a detailed configuration of an apparatus for arranging a plurality of items automatically in a space according to an exemplary embodiment of the present invention. Referring to FIG. 8, the apparatus for arranging the plurality of items automatically in the space according to the exemplary embodiment of the present invention may be configured to include a primary arrangement unit 810, an arrangement optimizing unit 820, an arrangement quality calculating unit 830.

The primary arrangement unit 810 serves to primarily arrange all the items in the canvas according to the exemplary embodiment of the present invention as described with respect to FIG. 1. As such, when the items are primarily arranged, the optimized arrangement result is obtained through the item position exchanging, the blank space removal, and the like by the arrangement optimizing unit 820. The arrangement quality calculating unit 830 serves to calculate the arrangement quality in order to determine an arrangement position selection condition of the primary arrangement unit 810, an item position exchanging condition of the arrangement optimizing unit 820, or the like according to the exemplary embodiment of the present invention.

More specifically, the primary arrangement unit 810 may be configured to include an item aligning unit 811, an item selecting unit 812, an arrangement position selecting unit 813, a cell dividing unit 814, an item arranging unit 815, a first canvas size adjusting unit 816.

First, the item aligning unit 811 aligns a total of n items in the order of size. In this case, the largest item is set as a first item, and a second item, a third item, . . . , an n-th item are set in the order of size.

The sizes of the items may be set based on various criteria. For example, a breadthwise×lengthwise (i.e., an area) of each item may be set as the size of the corresponding item and the order of the sizes of the items may is be set in an order in which a width of the item is larger or an order in which a height of the item is larger, but the present invention is not limited thereto.

As such, when each item is aligned in the order of size by the item aligning unit 811, the item selecting unit 812 sequentially selects from the first item to thereby arrange the selected item in the canvas using the method according to the embodiment of the present invention as described above.

The arrangement position selecting unit 813 determines a position of which item among the k−1 items is divided in the canvas of the state in which the k−1 items are already arranged to thereby arrange the corresponding k-th item selected by the item selecting unit 812.

In this case, the method of selecting the arrangement position calculates the arrangement cost of each item and selects the lowest-cost item to thereby divide the cell, according to Equation 1 and Equation 2 as described above. Therefore, the cost of each item is calculated by the arrangement quality calculating unit 830 to thereby determine the lowest-cost item.

As such, when the arrangement position is determined by the arrangement position selecting unit 813, the cell dividing unit 814 horizontally or vertically divides the cell of the corresponding selected item. In this case, when the aspect ratio of the selected item is smaller than the aspect ratio of the cell, the cell dividing unit 814 performs the horizontal division, or otherwise, performs the vertical division.

The item arranging unit 815 arranges the corresponding selected item at the position of the divided cell. In this case, the item may be positioned at the center of the region of the divided cell.

Meanwhile, when the corresponding item is arranged, in the case in which the space is not enough to arrange the corresponding item, the first canvas size adjusting unit 816 increases the size of the entire canvas as needed. In this case, even though the size of the entire canvas is increased, it may be increased while constantly maintaining the preset horizontal to vertical ratio of the canvas.

When the primary item arrangement by the primary arranging unit 810 is completed by arranging to repeat the same process for the total of n items, the arrangement optimizing unit 820 obtains the finally optimized arrangement result by exchanging the positions of the arranged item or removing the blank spaces.

More specifically, the arrangement optimizing unit 820 may be configured to include an item position exchanging unit 821, a blank removing unit 822, a second canvas size adjusting unit 823.

The item position exchanging unit 821 improves arrangement efficiency by exchanging the exchangeable item pairs with each other to further optimize the arrangement of the primarily arranged items as described above in the description of FIG. 2. That is, the item position exchanging unit 821 selects the exchangeable pair on the subtree as in FIG. 5 and calculates the penalties of two items due to the position exchanging by the arrangement quality calculating unit 830 as described above.

That is, the item position exchanging unit 821 attempts the position exchanging for the item pairs capable of physically performing the position exchanging (i.e., the item pairs capable of entering the cell of each other) in order to optimize the arrangement result. In this case, when the position exchanging is performed as described above, the penalties of two items are changed, where a list of the pairs in which the larger value among the penalties of two items becomes lower due to the position exchanging is obtained and the position exchanging is sequentially performed with start from the pair in which the penalty becomes lower as much as possible. The above-mentioned item position exchanging unit 821 repeatedly performs the above-mentioned method, and stops the performance at a point in time in which the arrangement quality of the item having the minimum arrangement quality is not improved (i.e., the penalty of the item having the maximum penalty does not become lower). Through the above-mentioned configuration, the optimized arrangement may be obtained.

The blank removing unit 822 minimizes the blank spaces by adjusting the final cell boundary after obtaining the arrangement optimized by the item position exchanging unit 821. That is, even after the primary arrangement of FIG. 1 and the position change of FIG. 2 as described above, the respective items include blank spaces more than what is needed in each cell. Therefore, the blank removing unit 822 minimizes the blank spaces by removing the cell blank in each cell. Through the above-mentioned configuration, the optimized item arrangement result as shown in the right side of FIG. 2 may be obtained.

As such, after the cell blank is removed by the blank removing unit 822, the second canvas size adjusting unit 823 adjusts the canvas according to the optimized item arrangement result to the preset size. In this case, even though the size of the canvas is increased during the item arrangement, since the horizontal to vertical ratio is constantly maintained, the second canvas size adjusting unit 823 reduces the size of the canvas at the same ratio.

According to the exemplary embodiment of the present invention, an item rotation processing unit 840 rotates each item by a preset constant angle about the cell center without cutting each item from the collage image in which the item is arranged by the arrangement optimizing unit 820. Through the above-mentioned configuration, a collage having different form capable of guessing how much portion is not seen from the collage may be obtained as shown in FIG. 13.

As such, the collage image manufactured by the apparatus is stored in a database, where the stored collage image is applied to a web server or the like to configure various forms of web pages, thereby obtaining a visual effect.

Meanwhile, the respective components of the apparatus are separately indicated on the drawings to indicate that they may be functionally and logically separated, and do not mean that they are necessarily physically separate components or are implemented with separate codes.

In addition, each function unit (or a module) in the specification may mean functional and structural coupling of hardware, such as a processor of a computer, for performing a technical spirit of the present invention and software for driving the hardware. For example, it may be easily inferred from those skilled in the art that each function unit may mean a predetermined code and a logical unit of a hardware resource for performing the predetermined code, but does not mean necessarily physically connected code or mean one type of hardware.

Method for Arranging Automatically Items

Figure 9:
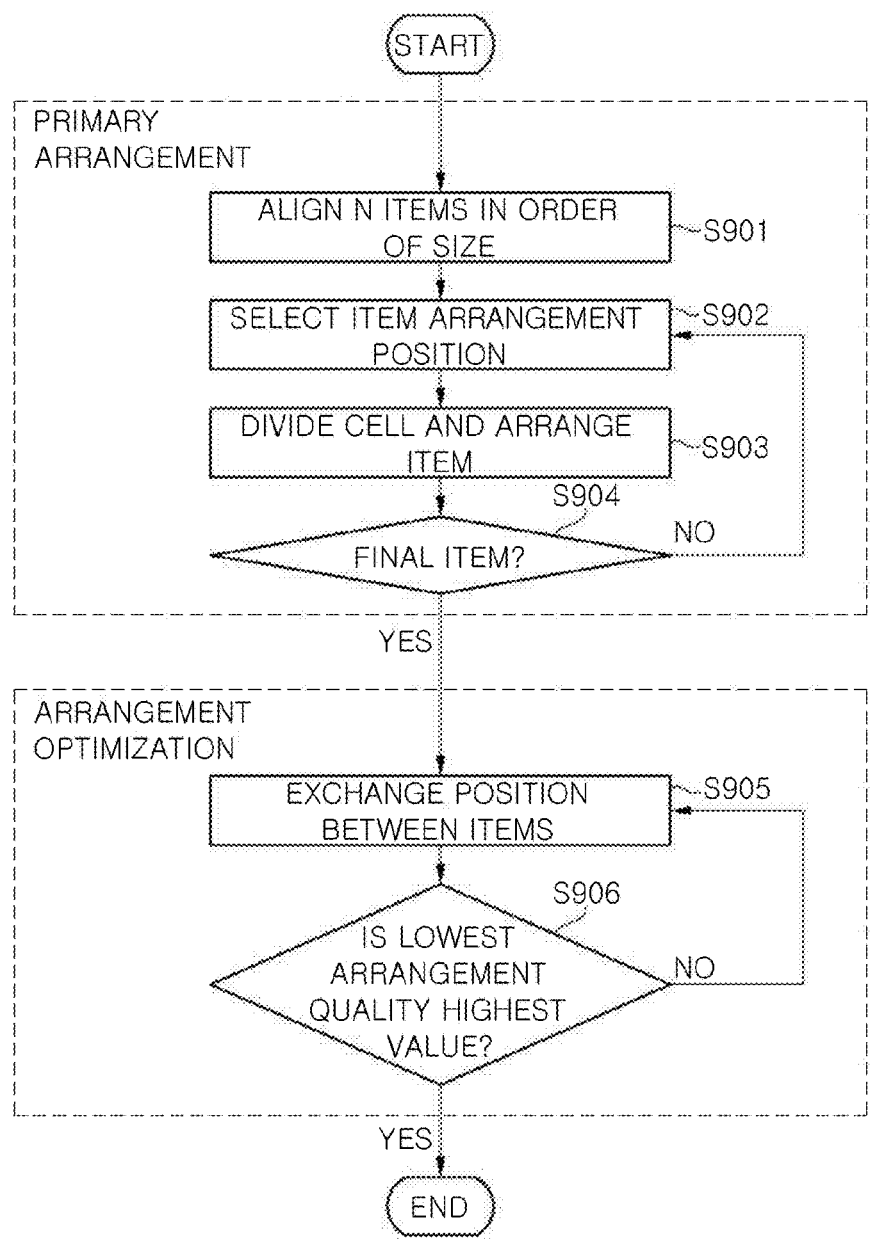
FIG. 9 is a flowchart showing processes for arranging the plurality of items automatically in the canvas according to an exemplary embodiment of the present invention.

FIG. 9 is a flowchart showing processes for arranging the plurality of items automatically in a space according to an exemplary embodiment of the present invention. Referring to FIG. 9, as an operation of primarily arranging items, first, n items are aligned in an order of size from large to small (S901). Next, an arrangement position of each item is selected in the order of size (S902). A cell division is performed for the selected arrangement position and the corresponding item is then arranged (S903). When the item arrangement is sequentially performed in the order of size and with the same method and the arrangement of the final item is completed (S904), an arrangement optimizing process is performed.

That is, in order to optimize the arrangement according to the exemplary embodiment of the present invention, the positions between the items are exchanged (S905) and the blank spaces are removed. In this case, the position exchanging between the items is performed until the arrangement quality of the item having the lowest arrangement quality becomes the highest value, as described above (S906).

Figure 10:
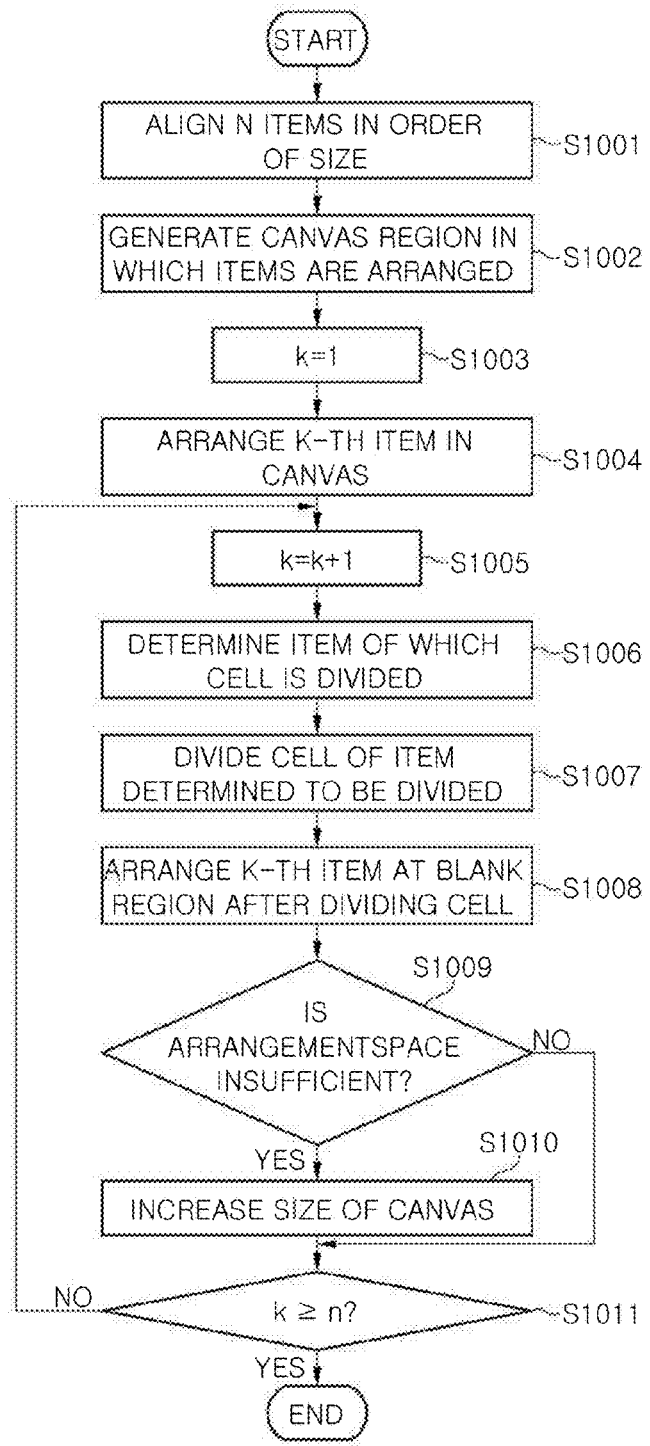
FIG. 10 is a flowchart showing a detailed process of a first arrangement according to an exemplary embodiment of the present invention.

FIG. 10 is a flowchart showing a detailed process of a primary arrangement according to an exemplary embodiment of the present invention. The exemplary embodiment of the operation of the primary arrangement of FIG. 9 will be described in detail with reference to FIG. 10.

First, n items are aligned in the order of size (S1001) and a canvas region in which the items are arranged is generated (S1002). In this case, the canvas region may be preset so as to have a constant aspect ratio. Next, an arrangement for a k-th item is performed in the order of size of the items. That is, an initial k is set to 1 (S1003) to thereby arrange the first item in the canvas (S1004), and a value of k is then increased by one (S1005) to thereby arrange the k-th item.

A method for arranging the k-th item determines the item dividing a cell to arrange the k-th item among the already arranged items (S1006). Next, the cell of the item determined to be divided is horizontally or vertically divided (S1007).

The k-th item is arranged in the divided blank region after dividing the cell (S1008). In this case, when an arrangement space of the k-th item is insufficient, the size of the canvas is increased as needed while constantly maintaining an aspect ratio thereof (S1010).

As such, when the arrangement for the total of n items is completed (S1011), the primary arrangement is completed.

The exemplary embodiment of FIG. 10 is implemented so that a plurality of (n) items are aligned in the order of size and the items are then arranged in the aligned size order. However, the items may not be selectively arranged in the order of size and may be arranged in an arbitrary order.

That is, it may be implemented such that any k-th item may be selected regardless of the size of the n items, a position at which the selected item is arranged is determined, a cell region of the determined position is divided, and the k-th item is then arranged. According to the exemplary embodiments of the present invention, when the arrangement space of the later arranged item is insufficient, the space sufficient to arrange the item by increasing the size of the canvas may be secured, such that even though the item larger than a previously arranged item is subsequently arranged, the arrangement according to the present invention may be performed.

Hereinabove, although the present invention is described by specific matters such as concrete components, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. An apparatus for arranging a plurality of items on a canvas, the apparatus comprising:
    an item selecting unit configured to select items to be arranged on the canvas one by one in an order of a size of the items;
    an arrangement position selecting unit configured to determine a position of a cell which is divided to arrange a k-th item among the respective cells having k−1 items arranged therein on the canvas;
    a cell dividing unit configured to divide a cell region of the position determined by the arrangement position selecting unit;
    an item arranging unit configured to arrange the k-th item at the position of the divided cell;
    a first canvas size adjusting unit configured to increase a preset size of the canvas as needed in a case in which a space to be arranged is insufficient when the item arranging unit arranges the k-th item at the position of the divided cell; and
    a blank removing unit configured to minimize blank spaces within each of the respective cells by adjusting the size of each item arranged on the canvas, after the k-th item has been arranged at the position of the divided cell;
    wherein the size of each item arranged on the canvas is adjusted in a first direction and a second direction perpendicular to the first direction, while maintaining a same size ratio of each item relative to each of others of the plurality of items before and after the size of each item is adjusted, so that a relative size of one image of each item compared to an image of each of the others of the plurality of items is maintained before and after the size of each item is adjusted, and the size of at least two of the plurality of items are different from each other after the size of each item is adjusted.

2. The apparatus of claim 1, further comprising:
    an item aligning unit configured to align n items to be arranged on the canvas in the order of size;
    wherein the item selecting unit is configured to select the items to be arranged from the n items aligned by the item aligning unit.

3. The apparatus of claim 1, further comprising:
    an arrangement quality calculating unit configured to calculate an arrangement cost of the k-th item for each of a first item to a k−1-th item already arranged on the canvas to determine a cell having an item having a minimum calculated arrangement cost arranged therein as a cell to be divided.

4. The apparatus of claim 3, wherein the arrangement cost is calculated based on the blank space of the cell, a size of a portion to be cut out of the cell at the time of expanding the item arranged in the cell, or a size of the k-th item.

5. The apparatus of claim 1, wherein the cell dividing unit divides the cell region of the position selected by the arrangement position selecting unit in the first direction or the second direction, and
    performs the division in the first direction when an aspect ratio of the k-th item to be arranged is smaller than an aspect ratio of the cell of the selected position and performs the division in the second direction when the aspect ratio of the k-th item to be arranged is not smaller than the aspect ratio of the cell of the selected position.

6. The apparatus of claim 1, wherein the first canvas size adjusting unit increases the size of the canvas while maintaining a preset aspect ratio of the canvas.

7. The apparatus of claim 3, further comprising:
    an item position exchanging unit configured to increase arrangement efficiency by configuring the items arranged in the canvas in a tree form according to a division structure and exchanging positions of two items positioned on the same subtree of the tree with each other.

8. The apparatus of claim 7, wherein the item position exchanging unit confirms a change of penalty calculated by the arrangement quality calculating unit in response to the exchanging of the positions, obtains a list of pairs in which a larger value of the penalties of two items becomes lower due to the exchanging of the positions, and sequentially performs the exchanging of the positions with start from a pair in which the penalty becomes lower, and
    the penalty is calculated based on the blank space of the cell having each item arranged therein and a size of a portion to be cut out of the cell at the time of expanding each arranged item.

9. The apparatus of claim 1, further comprising:
    a second canvas size adjusting unit configured to reduce the size of the canvas having the minimized blank spaces at a same ratio used in increasing the size of the canvas, to thereby adjust the canvas size to the preset size.

10. The apparatus of claim 1, further comprising:
    an item rotation processing unit configured to rotate each item by a preset angle about a cell center without cutting each item arranged on the canvas.

11. A method for arranging a plurality of items on a canvas performed in an apparatus for arranging the items on the canvas, the method comprising:
    an operation of selecting items to be arranged on the canvas one by one in an order of a size of the items;
    an operation of determining a position of a cell which is divided to arrange a k-th item among the respective cells having k−1 items arranged therein on the canvas;
    an operation of dividing a cell region of the determined position;
    an operation of arranging the k-th item at the position of the divided cell;
    an operation of increasing a preset size of the canvas as needed in a case in which a space to be arranged is insufficient when the k-th item is arranged at the position of the divided cell; and
    an operation of minimizing blank spaces within each of the respective cells by adjusting the size of each item arranged on the canvas, after the k-th item has been arranged at the position of the divided cell;
    wherein the size of each item arranged on the canvas is adjusted in a first direction and a second direction perpendicular to the first direction while maintaining a same size ratio of each item relative to each of others of the plurality of items before and after the size of each item is adjusted, so that a relative size of one image of each item compared to an image of each of the others of the plurality of items is maintained before and after the size of each item is adjusted, and the size of at least two of the plurality of items are different from each other after the size of each item is adjusted.

12. The method of claim 11, further comprising:
an operation of aligning n items to be arranged on the canvas in the order of size;
wherein, in the selecting operation, the items to be arranged are selected from the aligned n items.

13. The method of claim 11, further comprising:
an operation of calculating arrangement cost of the k-th item for each of a first item to a k−1-th item already arranged on the canvas to determine a cell having an item having a minimum calculated arrangement cost arranged therein as a cell to be divided.

14. The method of claim 13, wherein the arrangement cost is calculated based on the blank space of the cell, a size of a portion to be cut out of the cell at the time of expanding the item arranged in the cell, or a size of the k-th item.

15. The method of claim 11, wherein in the operation of dividing the cell region,
the cell region of the position selected by the operation of determining of the position is divided in the first direction or the second direction, and
the division in the first direction is performed when an aspect ratio of the k-th item to be arranged is smaller than an aspect ratio of the cell of the selected position and the division in the second direction is performed when the aspect ratio of the k-th item to be arranged is not smaller than the aspect ratio of the cell of the selected position.

16. The method of claim 11, wherein in the operation of increasing the size of the canvas, the size of the canvas is increased while maintaining a preset aspect ratio of the canvas.

17. The method of claim 11, further comprising:
an operation of exchanging an item position for increasing arrangement efficiency by configuring the items arranged in the canvas in a tree form according to a division structure and exchanging positions of two items positioned on the same subtree of the tree with each other.

18. The method of claim 17, wherein in the operation of exchanging the item position,
a change of penalty calculated in response to the exchanging of positions is confirmed, a list of pairs in which a larger value of the penalties of two items becomes lower due to the exchanging of the positions is obtained, and the exchanging of the positions is sequentially performed with start from a pair in which the penalty becomes lower, and
the penalty is calculated based on the blank space of the cell having each item arranged therein and a size of a portion to be cut out of the cell at the time of expanding each arranged item.

19. The method of claim 11, further comprising:
an operation of reducing the size of the canvas having the minimized blank spaces by the operation of minimizing the blank spaces at a same ratio used in increasing the size of the canvas, to thereby adjust the canvas size to the preset size.

20. A non-transitory computer readable medium storing an executable program which, when executed in a computing apparatus, performs a method for arranging a plurality of items automatically on a canvas, the method comprising:
an operation of selecting items to be arranged on the canvas one by one in an order of a size of the items;
an operation of determining a position of a cell which is divided to arrange a k-th item among the respective cells having k−1 items arranged therein on the canvas;
an operation of dividing a cell region of the determined position;
an operation of arranging the k-th item at the position of the divided cell;
an operation of increasing a preset size of the canvas as needed in a case in which a space to be arranged is insufficient when the k-th item is arranged at the position of the divided cell; and
an operation of minimizing blank spaces within each of the respective cells by adjusting the size of each item arranged on the canvas, after the k-th item has been arranged at the position of the divided cell;
wherein the size of each item arranged on the canvas is adjusted in a first direction and a second direction perpendicular to the first direction, while maintaining a same size ratio of each item relative to each of others of the plurality of items before and after the size of each item is adjusted, so that a relative size of one image of each item compared to an image of each of the others of the plurality of items is maintained before and after the size of each item is adjusted, and the size of at least two of the plurality of items are different from each other after the size of each item is adjusted.

21. The apparatus of claim 5, wherein the first direction is in a horizontal direction, and the second direction is in a vertical direction.

22. The method of claim 15, wherein the first direction is in a horizontal direction, and the second direction is in a vertical direction.

* * * * *